United States Patent Office 3,336,092
Patented Aug. 15, 1967

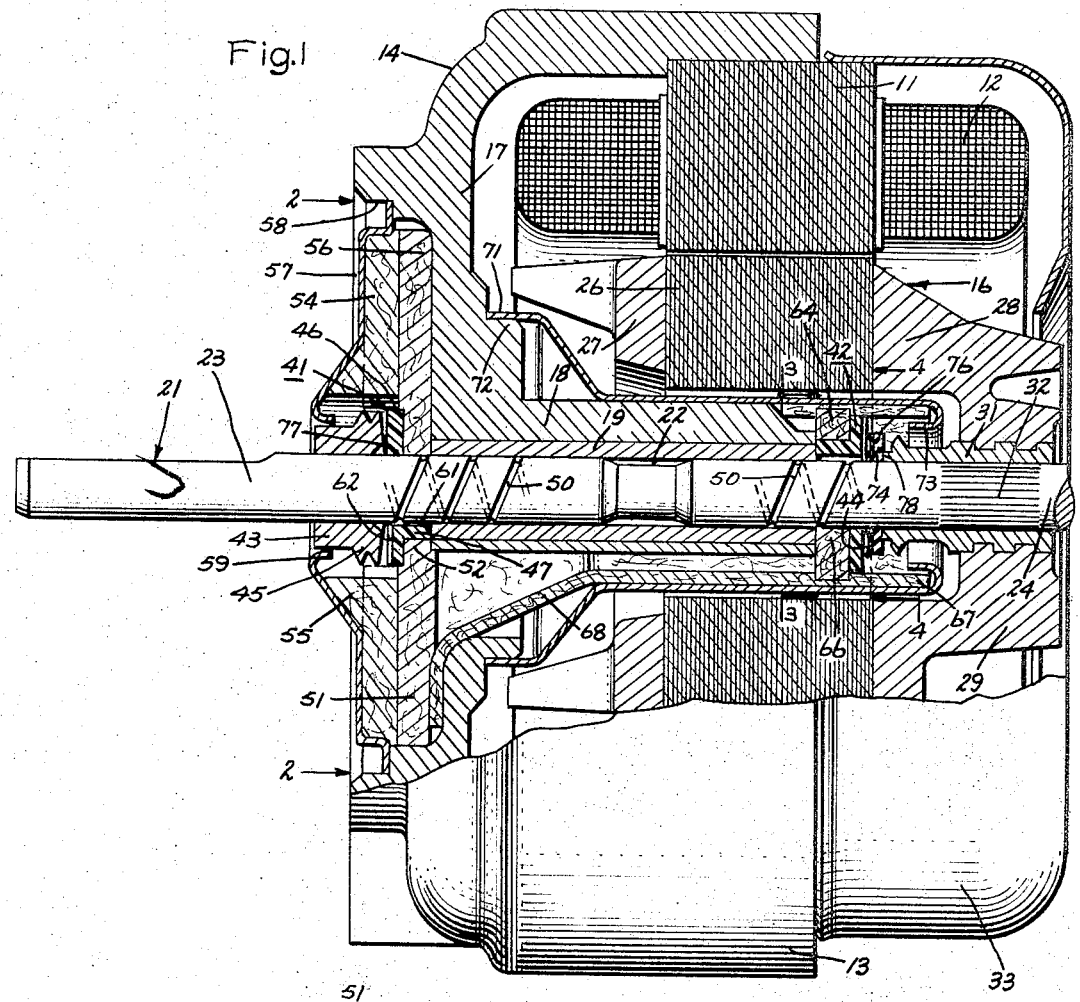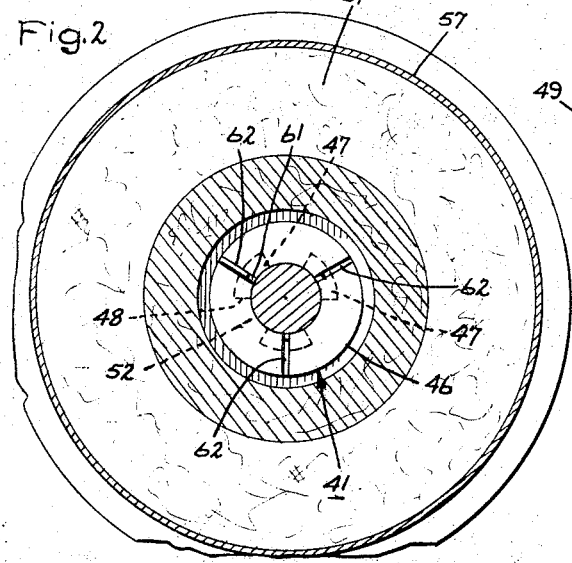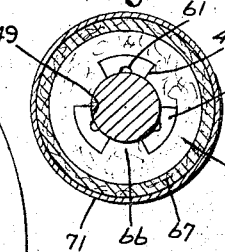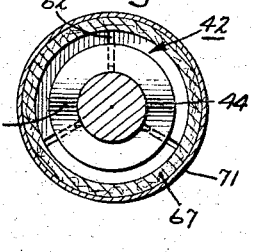
Aug. 15, 1967  R. W. DOCHTERMAN  3,336,092
DYNAMOELECTRIC MACHINE THRUST BEARING LUBRICATION
AND ROTATABLE ASSEMBLY NOISE SUPPRESSION SYSTEM
Filed Sept. 24, 1965
Inventor:
Richard W. Dochterman,
by John M. Stoudt
Attorney.

3,336,092
DYNAMOELECTRIC MACHINE THRUST BEARING LUBRICATION AND ROTATABLE ASSEMBLY NOISE SUPPRESSION SYSTEM
Richard W. Dochterman, Fort Wayne, Ind., assignor to General Electric Company, a corporation of New York
Filed Sept. 24, 1965, Ser. No. 489,867
8 Claims. (Cl. 308—132)

The present invention relates to dynamoelectric machines and in particular to an improved thrust bearing lubrication and rotatable assembly noise suppression system for use in such machines which permits operation of the machine in any position and still provides positive bearing lubrication and a low noise level of operation for the rotatable assembly.

In recent years there has been an increasing demand for low cost small and fractional size horsepower dynamoelectric machines which are not only capable of being mounted in any position during operation and provide satisfactory lubrication of the rotating components but in addition produce a low noise level of operation. A typical application for such machines is as a drive unit in audio and video tape recording equipment where the recorders are used in a variety of different positions and audible sounds originating in the drive unit could well distort the signal as it is being recorded. For example, a motor operating noise level above 38 decibels is considered to be excessive or objectionable and entirely unsatisfactory for many tape recording applications. An inexpensive and highly desirable dynamoelectric machine proposed for this type of application is the so-called "unit-bearing" induction electric motor. Unfortunately, there has been a practical difficulty in providing an operating noise level for the motor below the accepted maximum level.

In studying the troublesome noise level problem, especially in regard to unit-bearing motors, I have discovered that one of the principal noise contributing sources during motor operation is the thrust bearing system normally provided to limit the varying axial thrust or axial oscillation of the motor rotatable assembly, generally referred to as rotor "end bump." Among other things, I have determined that during rotation of the rotatable assembly, there is a strong tendency for the cooperating thrust surfaces in the system to separate and close together repeatedly. Moreover, as the rotatable assembly first begins to break away from a standstill or stationary position and starts to revolve, the relatively rotatable thrust surfaces have not as yet been adequately lubricated; i.e., lack positive lubrication. This initial starved lubrication condition of the relatively rotating or rubbing thrust surfaces not only generates noise until sufficient lubrication has finally been supplied between the coacting thrust surfaces, but also diminishes the useful operating life of the thrust surfaces. During my extensive investigation of the problem, I have also found that the starved condition or lack of positive lubrication for the cooperating thrust surfaces at "break away" is particularly difficult to overcome in motors employing lubricant absorbent felt pads which feed lubricant by capillary action to the shaft journal of the rotatable assembly.

Consequently, it is a primary object of the present invention to provide an improved thrust bearing lubrication and rotatable assembly noise suppression system for dynamoelectric machines, and further to provide such a system which overcomes the difficulties and deficiencies outlined above.

It is yet another object of the present invention to provide an improved yet economical thrust bearing lubrication system, especially suitable for use in unit-bearing electric motors, which provides positive lubrication for relatively rotating motor components at all times, and suppresses noise normally resulting from revolution of the rotatable assembly, the features being obtained independently of the angle at which the motor is utilized when in operation.

In carrying out the objects in one form, I provide a dynamoelectric machine, having a rotatable assembly including a shaft, with an improved thrust bearing lubrication and rotatable assembly noise suppression system. The machine incorporates bearing means for journalling the shaft and a non-rotatable thrust receiving bearing member, preferably formed of self-lubricating molded plastic, having an axial section positioned at each end of the bearing means. Resilient lubricant absorbent material in the form of a felt pad, fabricated of compressed lubricant impregnated fiberous material, is employed to hold each thrust member in a stationary position such that the thrust receiving surface of the member faces away from the bearing means toward a cooperating thrust transmitting member, which is adapted to rotate with the shaft and serves as part of the means for applying a preload of predetermined magnitude to the thrust system.

The felt pad has radial fingers which project through a corresponding number of angularly spaced apart radial apertures extending entirely through the axial section of the associated thrust receiving member. The fingers carry lubricant by capillary action from the outer regions of the pad through the apertures and to the shaft at angularly spaced apart locations in the vicinity of the bearing means. In order to transfer lubricant to the thrust surfaces, the thrust receiving members have a number of communicating capillary grooves on the inner surface of the axial section, angularly between adjacent pad fingers, and in the thrust receiving surface.

With the foregoing arrangement, in spite of its cost advantages, positive lubrication of the thrust bearing surfaces is achieved even when the system employs wick-fed lubricant supplying structure. The capillary grooves may be initially filled with lubricant when the shaft journal wipes lubricant from the pad fingers during assembly and lubricant is always present at the journal and thrust surfaces by a continuous replacement of the used lubricant as lubricant is transferred as needed from the lubricant supplying fingers of the pad. Thus, lubricant is instantly available at the relatively rotating surfaces whenever the shaft first begins to revolve. The angular separation of the fingers also tends to limit potential reabsorption of lubricant by the pad while assisting in the retention of the thrust receiving members in the desired positions and causes larger beads of lubricant to be formed for easier transportation to the selected locations. In view of the lubrication characteristics of the system and the manner in which the thrust receiving members and resilient material are incorporated into the system, potential noise normally produced by the rotatable assembly during operation is suppressed and motor operation may readily be maintained below an acceptable noise level.

Further aspects of the invention will become more apparent from the detailed description of the invention. It will be understood that the specification concludes with claims which particularly point out and distinctly claim the subject matter which I regard as my invention. The invention, however, both as to organization and method of operation, together with further objects and advantages thereof, may be best understood by reference to the following description taken in conjunction with the accompanying drawing in which:

FIGURE 1 is a side elevational view, partly in section and partly broken away, illustrating a fractional horsepower electric motor of the unit-bearing type which incorporates the preferred thrust bearing lubrication and noise suppression system of the present invention;

FIGURE 2 is a sectional view taken along line 2—2 in FIGURE 1 to show details of one end of the thrust bearing lubrication system;

FIGURE 3 is a sectional view taken along line 3—3 in FIGURE 1 to reveal details of the other end of the thrust bearing lubrication system; and FIGURE 4 is a sectional view taken along line 4—4 in FIGURE 1, illustrating further details of the other end of this system.

Turning now more specifically to a consideration of the drawing, the preferred embodiment of the present invention is illustrated in connection with a unit-bearing fractional horsepower induction electric motor of the well-known shaded pole type. As shown, the motor incorporates a stationary member formed with a laminated stator core 11 of magnetic material which accommodates an excitation winding 12 arranged in suitable winding slots, with the core being mounted in a cast frame or housing 13. This single piece housing may be suitably fabricated of cast iron or die cast material or the like and has an end shield portion 14 functioning to support the stator core 11 and the rotatable member or rotor for relative rotation.

In order to support a rotatable assembly 16 for rotation with respect to stator core 11, frame 13 is formed with an integral, radially projecting portion 17 which in turn terminates in a central, axially extending, tubular bearing post 18 mounting an elongated sleeve type bearing 19 therein. The bearing rotatably journals a shaft 21 of the rotatable assembly, the shaft being undercut at 22 to effectively divide its journal surface into two journal areas thereby furnishing two spaced apart areas of support of the shaft by bearing 19. The shaft also has extensions 23, 24 projecting axially beyond each side of the bearing 19, extension 23 being the output end of the shaft and extension 24 serving to mount the motor rotor for rotation therewith.

The rotor is of conventional construction, having a laminated core 26 of magnetic material formed with the usual axial slots (not shown) spaced circumferentially adjacent the outer periphery thereof for accommodating conductors of a cast or fabricated electrically conductive squirrel cage secondary winding. Short circuiting end rings 27, 28 electrically join the conductors at each end of the rotor core and assist in retaining the laminations in stacked relation. End ring 28 is integrally connected to a hub section 29 which in turn is connected to shaft 21 by an interlocking tubular element 31 having an interference fit with knurls 32 provided circumferentially of shaft extension 24. A suitable metal cover 33, mounted to the periphery of stator core 11, encloses this side of the motor.

As thus far described, the unit-bearing electric motor components are well known and set out by way of example only. Turning now to the improved thrust bearing lubrication and noise suppression system incorporated in the motor of the exemplification, it will be seen from FIGURE 1 that a pair of non-rotatable thrust bearing members 41, 42 are provided at each end of the bearing post 18 for receiving the axial thrust from cooperating generally radial thrust transmitting members 43, 44 arranged to revolve with rotor shaft 21.

Taking the end of the bearing post 18 remote from rotor 16 seen in FIGURES 1 and 2, the thrust receiving member 41 includes an enlarged cylindrical thrust receiving section 46 having a generally radially thrust receiving surface, disposed perpendicular to the rotational axis of the shaft, which faces away from post 18 and toward thrust transmitting member 43. An axial section 47 of member 41, integrally joined at one end to section 46, abuts against post 18 at the other end for transferring the thrust load from member 43 to the rigid post 18 in an axial direction toward the other thrust receiving member 42. A plurality (three in the illustrated embodiment) of angularly spaced apart openings or apertures 48 are furnished radially through the axial section 47 and communicate with a central bore 49, which extends entirely through the member for accommodating shaft 21 with a loose fit to permit relative rotation therebetween. In actual practice, a bore was employed having a nominal diameter of 0.255 inch for a shaft formed with an 0.2493 inch nominal diameter. In the exemplification, axial section 47 and apertures 48 are defined by three angularly spaced apart generally wedge-shaped projections having their free ends bearing against the extreme end of post 18.

Proper support of member 41 at the desired location adjacent post 18 in the motor is achieved by slightly resilient or compressible lubricant impregnated material 51, which in the illustrated form, is a felt pad of compressed fibrous lubricant absorbent material having a generally circular outer configuration. The pad has a central opening approximating the circumferential contour conjointly defined by the wedge-shaped projections, apertures 48, and the portion of shaft 21 exposed to apertures 48. Thus, material 51 is fabricated with three angularly spaced apart radial fingers or wick portions 52 having their innermost edges in wiping engagement with the shaft during rotation of the shaft. These fingers serve several functions. They supply lubricant from the outer regions of the pad to the shaft by capillary action as dictated by the lubricant demands of the journal and thrust system. In addition, the fingers interlock with the axial section of member 41 to prevent its angular movement. Best results are obtained when employing at least three spaced apart fingers 52 of such size that they become compressed in apertures 48 of section 47. The provision of open ended apertures facilitates assembly of member 41 and pad 51.

By keeping the total circumferential length of the fingers in the neighborhood of 50% of the circumference and maintaining the fingers in spaced relation, the tendency for the pad to reabsorb lubricant is reduced and larger beads of lubricant are formed for easier transportation to the journal of bearing 19. Capillary grooves 50, provided in the shaft as shown in FIGURE 1, assist in lubricant transfer to the desired locations. This construction also reduces the rubbing friction between shaft 21 and the pad and minimizes the criticality of size control of the pad relative to the shaft.

It should be noted at this time that in the exemplification the outermost regions of pad 51 is part of a lubricant retaining reservoir which also includes a second generally cylindrical pad of lubricant absorbent material 54 filled with lubricant. The two pads are maintained in compressive face to face engagement within an enlarged cavity 56, formed in end shield portion 17 so as to face toward the exterior of the motor, by a metal cover 57 having a forced fit within recess 58 of portion 17. Pad 54 has a radially enlarged central hole of a dimensionally greater diameter than either that for thrust members 41, 43 and has an axial extension 55 for recapturing any lubricant which might be centrifugally thrown outward from lubricant slinger or thrower portion 45 of thrust member 43. The recaptured lubricant is then transferred to pad 51 for reuse to furnish a closed lubricant circulatory arrangement. Centrally in cover 57, there is provided a re-entrant flanged opening 59 surrounding a part of shaft extension 23 and thrust transmitting member 43 to permit egress of the output end of the shaft and to prevent any possible escape of lubricant beyond the confines of the motor at the left side of the motor as viewed in FIGURE 1.

To insure satisfactory transportation of lubricant from fingers 52 of felt pad 51 to the cooperating thrust surfaces of members 41, 43, the inner surface exposed toward shaft 21 of axial section 47 includes axial capillary grooves 61 which extend the axial length of the section at angular locations (e.g., 120° apart) between adjacent apertures 48. At section 46 of member 41, the grooves communicate with a corresponding number of capillary grooves 62 exposed to the thrust receiving surface of section 46, grooves 62 projecting the radial length of the surface. In actual practice, grooves having a dimensional width of 0.016 inch (nominal) were entirely satisfactory for transferring many commercially available lubricants by capillary action. Preferably, grooves 61, 62 are initially filled with lubricant when the shaft journal wipes lubricant from lubricant carrying fingers 52 of pad 51 as the components are being assembled together during manufacture of the motor. This lubricant is immediately available to lubricate and dampen vibrations in this area at the first instance of relative sliding movement of the components. Thereafter, the capillary grooves are continuously supplied with lubricant wiped from the fingers 52 as the shaft revolves. Consequently, positive and immediate lubrication of the cooperating thrust surfaces is achieved even during the first and critical period of "break away," thereby enhancing both wear and noise characteristics of the components.

Turning now to a consideration of the other end of bearing post 18 and in particular to FIGURES 1, 3, and 4, it will be seen that thrust receiving member 42 is substantially identical to member 41. For convenience, similar structure is therefore identified by an identical numeral already used in connection with member 41. At the inboard end of the bearing post 18, the right side as viewed in FIGURE 1, a resilient pad of lubricant absorbent material 64, similar in construction to pad 51 except in overall size, is employed to support thrust receiving member 42 in the proper resilient and non-rotatable position adjacent the bearing post 18, with wick fingers 66 fitting into apertures 48 of the axial section 47 in the same manner already explained in regard to fingers 52 of pad 51. A resilient felt ring of compressible lubricant absorbent material 67 encircles pad 64 in compressive engagement therewith such that the free end of axial section 47 of member 42 abuts against the bearing post 18 in thrust transferring relation. Ring 67 also surrounds thrust transmitting member 44 and the adjacent rotatable components of the rotatable assembly in radially spaced relation to recapture any lubricant which might be thrown outwardly at that end of the motor. Integral felt projections 68, which extend from ring 67 along the outer surface of post 18 and into cavity 56 near the outer regions of pad 51, return lubricant from the ring to the lubricant reservoir for reuse. A drawn metal retaining cover 71, secured at one end to an annular shoulder 72 of the bearing post 18, has its other end formed with a re-entrant annular flange 73 outwardly of ring 67 to prevent escape of lubricant at that location.

To minimize noise producing potential of the cooperating bearing surfaces, the system is preloaded whereby a biasing force tends to maintain the rotatable assembly in a normal axial position shown in FIGURE 1 and holds cooperating thrust surfaces continuously in engaging relation, both at standstill and under operating conditions. This system is contrasted to a so-called free end play system in which there is no initial centering force. The biasing force of the system is provided in the exemplification by thrust transmitting member 44, which is a spring slightly bowed as indicated at 74 and held under preselected stress between thrust receiving member 42 and a resilient washer 76, composed of rubber or the like, disposed next to the extreme end 78 of element 31.

To preload the system with the desired force, after the motor components, except cover 57 and member 43, have been assembled together, member 43 is then slid onto shaft 21 into engagement with member 41. As the shaft 21 and rotor core 16 are being moved axially relative to member 43, as by a blow or other impact on core 16, members 41, 43 are maintained tightly against one another until the preselected preload is provided. Since member 43 preferably has an interference fit with shaft extension 23, it acts as a retainer and the system is effectly held in a preloaded condition at all times between thrust surface 77 of member 43 and the end 78 of element 31. For reducing wear between the thrust surfaces of cooperating members 41, 42, preferably thrust surface 77 slopes radially and axially away from member 41, intimate contact being made radially near the shaft 21. This establishes a definite place of engagement between members 41, 43 at the same radius from the axis of the motor where forces are low and allows a gradual movement of engagement outwardly if wear does occur.

The biasing force of the thrust system is also used to compress the thrust receiving sections of members 41, 42 firmly against the associated resilient or compressible pads 51, 64 as shown in FIGURE 1 so that the pads function to isolate, dampen, or otherwise cushion vibrations imparted to members 41, 42 as well as to support them. Vibration isolation may further be enhanced by forming members 41, 42 of plastic material having a high internal damping property, such as commercially available nylon filled with molydisulfide. This material is also a self-lubricating, moldable plastic which has excellent wear characteristics.

It will be appreciated from the foregoing that the present invention provides an improved and particularly effective thrust bearing lubrication and rotatable assembly noise suppressing system in which sliding components are isolated from structural members; e.g., covers 57, 71, that might otherwise serve as sound amplifiers. The system effectively dampens the vibration of varying intensity normally resulting from the rotatable assembly which might be induced from rotational frequencies, torque pulsations, and rotor resonances. For example, a number of small single phase electric motors, rated at 1550 r.p.m., output of 6–8 ounce-inches, 115 volts, and 60 cycle, were constructed in accordance with illustrated embodiment and tested. Under operating conditions, a representative maximum noise level for the tested motors was approximately 26 decibels as corrected, a level picked up six inches from the motor exterior. This level is far below the highly restrictive 38 decibel maximum placed upon certain tape recording applications. Augmenting the attainment of the satisfactory noise level is the positive bearing lubrication provided by the present invention which eliminates the "starved" lubricant condition previously outlined. These advantageous features are obtained in spite of the low cost benefits attributable to the present invention.

While in accordance with the patent statutes, I have described what at present is considered to be the preferred embodiment of my invention, it will be obvious to those skilled in the art that numerous changes and modifications may be made therein without departing from the invention. For instance, the system of the invention has practical application in motors other than the unit-bearing type by minor and obvious modifications thereto. It is therefore aimed in the appended claims to cover all such equivalent variations as fall within the true spirit and scope of the invention.

What I claim as new and desire to secure by Letters Patent of the United States is:

1. In a unit-bearing electric motor having a rotatable assembly including a shaft, bearing means for rotatably supporting the shaft; a preloaded thrust bearing and rotatable assembly noise suppression system comprising a non-rotatable thrust receiving member disposed at each end of said bearing means, each member having a section formed with a thrust receiving surface facing away from the other member and an axial section projecting toward said bearing means defined by a plurality of non-rotatable angularly spaced apart, generally wedge-shaped portions; a bore extending axially through each of said members for accommodating a part of the shaft; resilient lubricant absorbent material for holding each of said members in a stationary position and for cushioning said member; said material including fingers extending through spaces between adjacent wedge-shaped portions to transfer lubricant by capillary action from the outer regions of said lubricant absorbent material to said bore and to prevent angular movement of the associated thrust members; and means rotatable with said shaft for transmitting thrust of the rotatable assembly to the thrust receiving members and for applying a preload to the system.

2. In an electric motor having a rotatable assembly including shaft, bearing means for rotatably supporting the shaft, a preloaded thrust bearing and rotatable assembly noise suppression system comprising a non-rotatable thrust receiving member disposed at each end of said bearing means, each member having a section formed with a thrust receiving surface facing away from the other member and an axial section projecting toward said bearing means; a bore extending axially through said member; a plurality of apertures formed at angularly spaced apart locations through said axial section in communication with said bore; means resiliently holding each of said members in a stationary position and dampening vibrations transferred thereto; said resilient means including lubricant transferring fingers extending through said apertures whereby lubricant may be transported to the bore and angular movement of said member is prevented; and means rotatable with said shaft for transmitting thrust of the rotatable assembly to the thrust receiving members and for applying a preload to the system.

3. The system of claim 1 in which capillary grooves are formed on the inner bore surfaces of the wedge-shaped portions of at least one of said thrust receiving members and communicate with capillary grooves in the thrust receiving surface of said member whereby the transfer of lubricant between said fingers and the thrust receiving surface is facilitated.

4. The system of claim 1 in which the latter means comprises a thrust transmitting member rotatable with the shaft in engagement with one of said thrust receiving members at a radial location adjacent the shaft, and a second thrust transmitting members including spring means maintained under compression for applying a preselected preload to the system.

5. In a dynamoelectric machine having a rotatable assembly including a shaft and a bearing lubrication and rotatable assembly noise suppression system, at least one single-piece, non-rotatable, thrust receiving member having a generally radially extending thrust receiving section and an axially extending section; an opening extending axially through said member for accommodating the shaft of the rotatable assembly; a plurality of angularly spaced apart apertures extending entirely through said axial section in communication with said opening; and resilient lubricant absorbent material supporting said member and tending to dampen movement thereof; said resilient material including fingers disposed in said apertures for supplying lubricant to the shaft and for preventing rotation of said member.

6. In a dynamoelectric machine having a rotatable assembly including a shaft and a bearing lubrication and rotatable assembly noise suppression system, at least one single-piece, non-rotatable, thrust receiving member formed of plastic material; said member having a generally radially extending thrust receiving section, an axially extending section and a bore extending axially through said member for loosely accommodating the shaft of the rotatable assembly; a plurality of capillary grooves formed on the inner surface of said member at the bore and on the thrust surface of said thrust receiving section to permit lubricant transfer therebetween; and means resiliently supporting said member and preventing rotation thereof.

7. In a dynamoelectric machine having a rotatable assembly including a shaft and a bearing lubrication and rotatable assembly noise suppression system, at least one single-piece, plastic thrust receiving member having a generally radially extending thrust receiving surface, an axially extending section, a bore having an axial surface and a plurality of apertures through said axially extending section in communication with said bore; means including lubricant absorbent material having fingers projecting into said apertures for resiliently supporting said member and for supplying lubricant to said bore; and capillary grooves formed on at least one of said surfaces to facilitate transfer of lubricant away from said fingers.

8. In a dynamoelectric machine having a rotatable assembly including a shaft and a bearing lubrication and rotatable assembly noise suppression system, at least one single-piece, non-rotatable, thrust receiving member composed of a self-lubricating molded plastic material; said member having a thrust receiving section and an axial section defined by a number of angularly spaced apart, axially projecting wedge-shaped portions integrally joined together at one end to said thrust receiving section; an opening extending axially through said member for accommodating the shaft of the rotatable assembly; said thrust receiving section and at least some of said wedge-shaped portions having communicating capillary grooves, with the grooves in said wedge-shaped portion being exposed toward the shaft to permit lubricant transfer between the communicating grooves; and a compressible pad of lubricant absorbent material resiliently supporting said member; said pad including wick fingers disposed in the space between adjacent wedge-shaped portions for supplying lubricant to the capillary grooves and shaft while preventing rotation of said member.

References Cited
UNITED STATES PATENTS

| | | | |
|---|---|---|---|
| 2,362,667 | 11/1944 | Schmidt | 308—160 |
| 2,571,672 | 10/1951 | Bradley | 308—132 |
| 2,751,265 | 6/1956 | Wightman | 308—132 |
| 2,752,208 | 6/1956 | Wightman | 308—171 |
| 2,945,729 | 7/1960 | Mitchell | 308—132 |
| 3,116,957 | 1/1964 | Fikse | 308—103 |
| 3,235,317 | 2/1966 | Cunningham | 308—132 |

MARTIN P. SCHWADRON, *Primary Examiner.*

R. A. DUA, *Assistant Examiner.*